(12) United States Patent
Wu et al.

(10) Patent No.: US 9,071,186 B2
(45) Date of Patent: Jun. 30, 2015

(54) METHOD AND APPARATUS FOR CONTROLLING AN ALTERNATING CURRENT MACHINE

(71) Applicants: Long Wu, Fargo, ND (US); Tianjun Fu, Moline, IL (US); Chris J. Tremel, West Fargo, ND (US)

(72) Inventors: Long Wu, Fargo, ND (US); Tianjun Fu, Moline, IL (US); Chris J. Tremel, West Fargo, ND (US)

(73) Assignee: Deere & Company, Moline, IL (US)

( * ) Notice: Subject to any disclaimer, the term of this patent is extended or adjusted under 35 U.S.C. 154(b) by 291 days.

(21) Appl. No.: 13/861,672

(22) Filed: Apr. 12, 2013

(65) Prior Publication Data

US 2014/0306637 A1  Oct. 16, 2014

(51) Int. Cl.
*H02P 1/24* (2006.01)
*H02P 27/08* (2006.01)
*B60L 1/00* (2006.01)
*H02P 21/00* (2006.01)
*H02P 21/14* (2006.01)
*H02P 7/00* (2006.01)

(52) U.S. Cl.
CPC . *H02P 27/08* (2013.01); *B60L 1/00* (2013.01); *H02P 21/0035* (2013.01); *H02P 21/148* (2013.01); *H02P 2007/0088* (2013.01); *H02P 2207/05* (2013.01)

(58) Field of Classification Search
CPC . H02P 21/141; H02P 21/146; H02M 7/53873
USPC ........................... 318/727, 799, 801, 599, 811
See application file for complete search history.

(56) References Cited

U.S. PATENT DOCUMENTS

| 4,868,481 | A | * | 9/1989 | Owen ........................... 323/253 |
| 5,321,598 | A | | 6/1994 | Moran |
| 5,552,980 | A | * | 9/1996 | Garces et al. .................... 363/98 |
| 5,977,660 | A | * | 11/1999 | Mandalakas et al. ......... 307/105 |
| 7,190,143 | B2 | | 3/2007 | Wei et al. |
| 7,446,511 | B2 | * | 11/2008 | Wu et al. ........................ 323/207 |
| 7,834,480 | B2 | * | 11/2010 | Mandalakas et al. ........... 307/46 |
| 2009/0322264 | A1 | | 12/2009 | Imura |
| 2011/0031920 | A1 | | 2/2011 | Henderson et al. |
| 2012/0217915 | A1 | | 8/2012 | Wu et al. |
| 2012/0217923 | A1 | | 8/2012 | Wu et al. |
| 2013/0088905 | A1 | | 4/2013 | Lee et al. |

OTHER PUBLICATIONS

International Search Report and Written Opinion for PCT/US14/32684 dated Aug. 19, 2014.
International Search Report and Written Opinion for PCT/US14/32619 dated Aug. 19, 2014.

* cited by examiner

*Primary Examiner* — Rina Duda
(74) *Attorney, Agent, or Firm* — Harness, Dickey & Pierce

(57) ABSTRACT

In one example embodiment, a device for controlling an alternating current (AC) machine is disclosed. The device includes a processor configured to determine a plurality of instantaneous voltages corresponding to a plurality of phase voltages of an inverter, the inverter driving the AC machine. The processor is further configured to determine an actual line-to-line voltage of the inverter based on the plurality of instantaneous voltages. The processor is further configured to determine a terminal voltage feedback for controlling the AC machine, based on the determined actual line-to-line voltage and a terminal voltage threshold.

21 Claims, 9 Drawing Sheets

METHOD AND APPARATUS FOR CONTROLLING AN ALTERNATING CURRENT MACHINE

FIELD

Example embodiments are related to electronic drive device systems and methods for controlling alternating current (AC) devices such as Interior Permanent Magnet (IPM) motors or machines.

BACKGROUND

Alternating current (ac) machines (e.g., IPM machines) are extensively used in loaders, combines or other heavy equipment machinery vehicle electric drive because they provide a higher efficiency than direct current (dc) machines. Of the ac machines, an Interior Permanent Magnet (IPM) machine has high drive efficiency and a wider constant power operating range. An IPM machine controller also called an inverter, controls operation of the IPM machine. The controller produces ac control signals which are applied to the terminals of the IPM machine.

In an IPM machine, extra high machine terminal voltage could detrimentally cause current regulation collapse, introduce additional harmonics in the inverter voltage output, cause degraded current regulation quality and associated side effects such as torque ripple, rotor magnet and stator winding heating, acoustic noise, etc. The extra high machine terminal voltage may depend on d/q-axis voltage commands, manufacturing and raw material tolerance such as permanent magnet, stator/rotor steel saturation characteristics can cause variance in the machine terminal voltage, accuracy of a position offset calibration, ambient and cooling temperatures, accuracy of the inverter onboard a current transducer (CT), etc.

Typically the controller controls the IPM machine based on a plurality of information. For example, an accurate estimation of the actual inverter or terminal voltage of the IPM machine, together with position information of the machine, may provide a better estimation of a torque output of the IPM machine, which in turn may complete the torque control loop.

SUMMARY

Some embodiments are directed to methods and apparatuses for controlling an AC machine such as an IPM machine through estimating the actual inverter or machine terminal voltage.

In one example embodiment, a device for controlling an alternating current (AC) machine is disclosed. The device includes a processor configured to determine a plurality of instantaneous voltages corresponding to a plurality of phase voltages of an inverter, the inverter driving the AC machine. The processor is further configured to determine an actual line-to-line voltage of the inverter based on the plurality of instantaneous voltages. The processor is further configured to determine a terminal voltage feedback for controlling the AC machine, based on the determined actual line-to-line voltage and a terminal voltage threshold.

In yet another example embodiment, the processor is configured to determine the plurality of instantaneous voltages by determining an instantaneous current polarity associated with a corresponding phase of the inverter based on at least one a positive current threshold and a negative current threshold. The processor is further configured to determine the plurality of instantaneous voltages by determining the plurality of instantaneous voltages based on a voltage across at least one switch associated with the corresponding phase of the inverter upon the instantaneous current polarity being less than the positive current threshold and greater than the negative current threshold, and determining the plurality of instantaneous voltages based on the instantaneous current polarity associated with the corresponding phase of the inverter upon at least one of the instantaneous current polarity being greater than the positive current threshold and the instantaneous current polarity being less than the negative current threshold.

In yet another example embodiment, the processor is configured to determine the actual line-to-line voltage by averaging the determined instantaneous voltages for each one of the plurality of phase voltages of the inverter over at least one of a single pulse width modulation (PWM) cycle of a PWM module and half of the single PWM cycle of the PWM module, the PWM module converting a two-phase representation of an inverter terminal voltage for driving the inverter to a three-phase representation of the inverter terminal voltage.

In yet another example embodiment, the processor is further configured to determine the actual line-to-line voltage by determining a terminal voltage space vector representation of the averaged instantaneous voltages.

In yet another example embodiment, the processor is further configured to determine the actual line-to-line voltage by determine the actual line-to-line voltage by determining a terminal voltage peak of the terminal voltage space vector representation of the averaged instantaneous voltages.

In yet another example embodiment, the processor is configured to determine the terminal voltage feedback by filtering the deter mined actual line-to-line voltage.

In yet another example embodiment, the processor is further configured to determine the terminal voltage feedback by determining an error based on the filtered actual line-to-line voltage and the terminal voltage threshold, and adjusting d/q-axis current commands based on the deter mined error such that the terminal voltage feedback is below the terminal voltage threshold and a total current magnitude is constant.

In yet another example embodiment, the processor is further configured to determine the terminal voltage threshold based on an operating mode of the AC machine and a dc bus voltage of the AC machine.

In yet another example embodiment, the operating mode of the AC machine is at least one of a motoring mode and a braking mode of the AC machine.

In yet another example embodiment, the control device is a field programmable gate array (FPGA).

In yet another example embodiment, the AC machine is at least one of an Interior Permanent Magnet (IPM) machine, an induction machine and a surface mounted permanent magnet machine.

In yet another example embodiment, a method for controlling an alternating current (AC) machine is disclosed. The method includes determining, by a processor, a plurality of instantaneous voltages corresponding to a plurality of phase voltages of the inverter, the inverter driving the AC machine. The method further includes determining, by the processor, an actual line-to-line voltage of the inverter based on the plurality of instantaneous voltages. The method further includes determining, by the processor, a terminal voltage feedback for controlling the AC machine, based on the determined actual line-to-line voltage and a terminal voltage threshold.

In yet another example embodiment, the determining the plurality of instantaneous voltages includes determining an instantaneous current polarity associated with a corresponding phase of the inverter based on at least one a positive current threshold and a negative current threshold. The determining the plurality of instantaneous voltages further includes determining the plurality of instantaneous voltages based on a voltage across at least one switch associated with the corresponding phase of the inverter upon the instantaneous current polarity being less than the positive current threshold and greater than the negative current threshold, and determining the plurality of instantaneous voltages based on the instantaneous current polarity associated with the corresponding phase of the inverter upon at least one of the instantaneous current polarity being greater than the positive current threshold and the instantaneous current polarity being less than the negative current threshold.

In yet another example embodiment, the determining the actual line-to-line voltage includes averaging the determined instantaneous voltages for each one of the plurality of phase voltages of the inverter over at least one of a single pulse width modulation (PWM) cycle of a PWM module and half of the single PWM cycle of the PWM module, the PWM module converting a two-phase representation of an inverter terminal voltage for driving the inverter to a three-phase representation of the inverter terminal voltage.

In yet another example embodiment, the determining the actual line-to-line voltage further includes determining a terminal voltage space vector representation of the averaged instantaneous voltages.

In yet another example embodiment, the determining the actual line-to-line voltage further includes determining a terminal voltage peak of the terminal voltage space vector representation of the averaged instantaneous voltages.

In yet another example embodiment, the determining the terminal voltage feedback includes filtering the determined actual line-to-line voltage.

In yet another example embodiment, the determining the terminal voltage feedback further includes determining an error based on the filtered actual line-to-line voltage and the terminal voltage threshold, and adjusting d/q-axis current commands based on the determined error such that the terminal voltage feedback is below the terminal voltage threshold and a total current magnitude is constant.

In yet another example embodiment, the method includes determining the terminal voltage threshold based on an operating mode of the AC machine and a dc bus voltage of the AC machine.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 2 is a block diagram of an electronic data processing system consistent with FIGS. 1A-B, according to an example embodiment;

FIG. 3 illustrates an inverter circuit outputting control signals to an electrical motor, according to an example embodiment;

FIG. 4 illustrates particular modules, including an estimation and threshold module of the system shown in FIGS. 1A-B, according to an example embodiment;

FIG. 5 illustrates a method carried out by the estimation and threshold module shown in FIG. 4, according to an example embodiment;

FIGS. 6A-B illustrate a pulse width modulation (PWM) cycle of the pulse width modulation module of FIGS. 1A-B, for a single control mode and a double control mode, according to an example embodiment;

FIG. 7 illustrates an instantaneous current polarity in an inverter circuit of the system, according to an example embodiment; and FIG. 8 illustrates adjustments to the d/q-axis current magnitudes and the corresponding angle such that the total current magnitude is kept constant, according to an example embodiment.

DETAILED DESCRIPTION

Figure 1A:
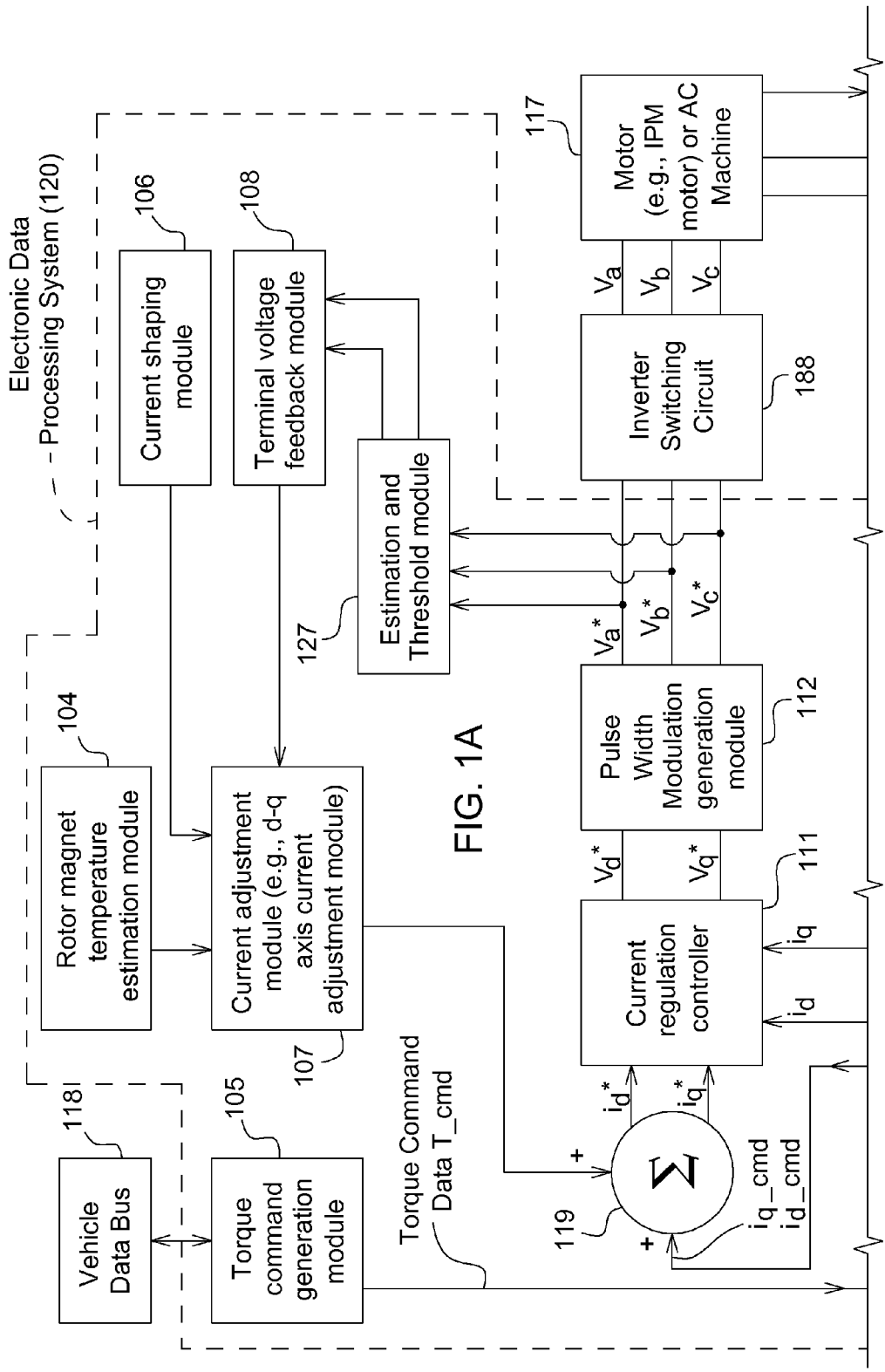
FIGS. 1A-B is a block diagram of a system for controlling an electrical motor, according to an example embodiment.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular foul's "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Figure 1B:
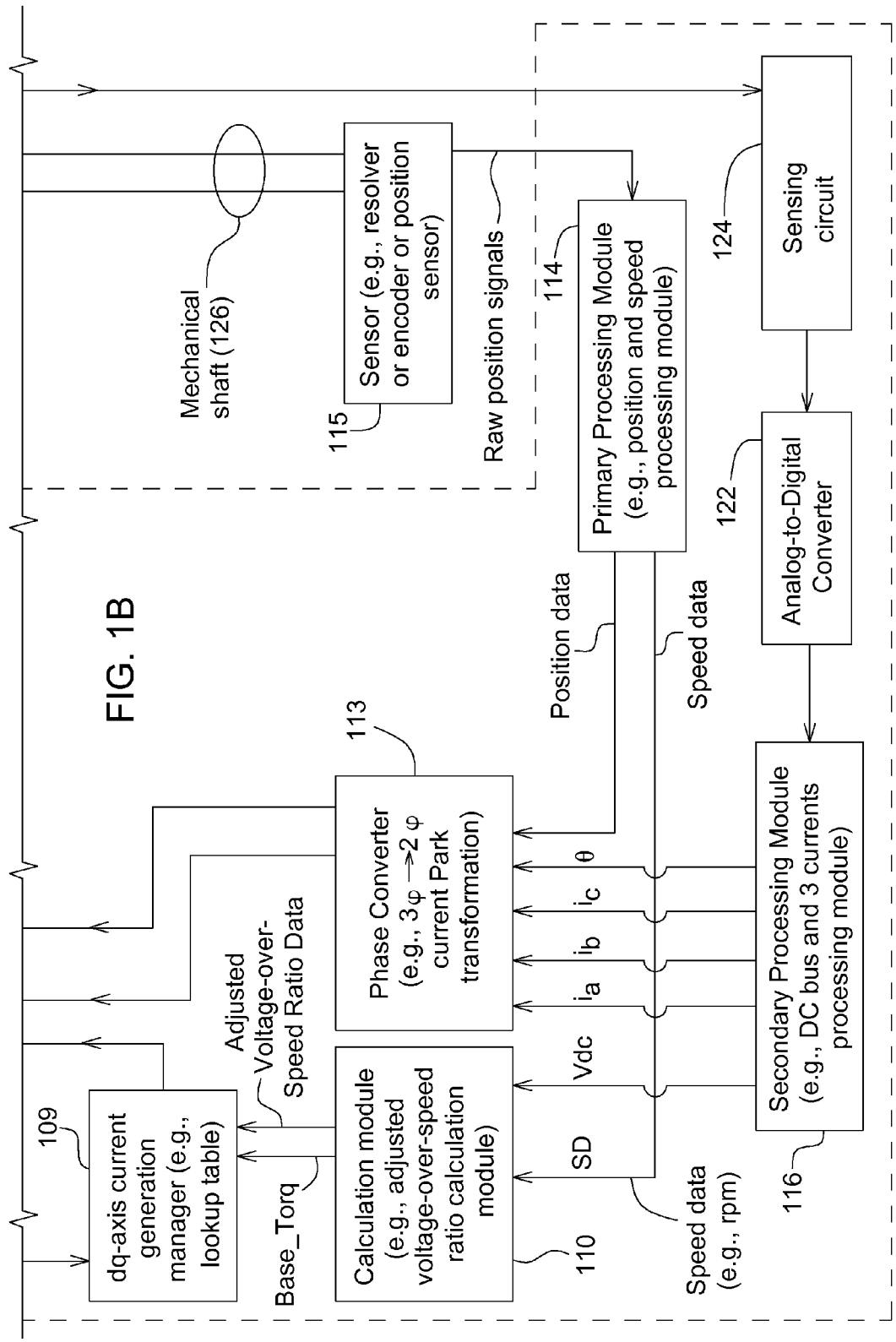

FIGS. 1A-B is a block diagram of a system for controlling an electrical motor, according to an example embodiment. The electrical motor may be a motor such as a motor 117 (e.g., an interior permanent magnet (IPM) motor) or another alternating current machine. The motor 117 has a nominal dc bus voltage (e.g., 320 Volts). The nominal voltage is a named voltage. For example, a nominal voltage of the motor 117 may be 320 Volts, but the motor may operate at a voltage above and below 320 Volts. In an example embodiment, the system, aside from the motor 117, may be referred to as an inverter or a motor controller. The system for controlling the motor 117 may also be referred to as an IPM machine system.

The system includes electronic modules, software modules, or both. In an example embodiment, the motor controller includes an electronic data processing system 120 to support storing, processing and execution of software instructions of one or more software modules. The electronic data processing system 120 is indicated by the dashed lines in FIGS. 1A-B and is shown in greater detail in FIG. 2. The electronic data processing system 120 may also be referred to as a controller for the motor 117.

In an example embodiment, a torque command generation module 105 is coupled to a d-q axis current generation manager 109 (e.g., d-q axis current generation look-up tables). The d-q axis current refers to the direct axis current and the quadrature axis current as applicable in the context of vector-controlled alternating current machines, such as the motor 117. The output of the d-q axis current generation manager 109 (d-q axis current commands iq_cmd and id_cmd) and the output of a current adjustment module 107 (e.g., d-q axis current adjustment module 107) are fed to a summer 119. In turn, one or more outputs (e.g., direct axis current data (id*) and quadrature axis current data (iq*)) of the summer 119 are provided or coupled to a current regulation controller 111. While the term current command is used, it should be understood that current command refers to a target current value.

The current regulation controller 111 is capable of communicating with the pulse-width modulation (PWM) generation module 112 (e.g., space vector PWM generation module). The current regulation controller 111 receives respective adjusted d-q axis current commands (e.g., id* and iq*) and actual d-q axis currents (e.g., id and iq) and outputs corresponding d-q axis voltage commands (e.g., vd* and vq* commands) for input to the PWM generation module 112.

In an example embodiment, the PWM generation module 112 converts the direct axis voltage and quadrature axis voltage data from two phase data representations into three phase representations (e.g., three phase voltage representations, such as va*, vb* and vc*) for control of the motor 117. va*, vb* and vc* may be referred to as inverter terminal voltages. Outputs of the PWM generation module 112 are coupled to an inverter circuit 188. The output stage of the inverter circuit 188 (e.g., output terminal voltages va, vb and vc) provides a pulse-width modulated voltage waveform or other voltage signal for control of the motor 117. In an example embodiment, the inverter circuit 188 is powered by a direct current (dc) voltage bus.

The inverter circuit 188 includes a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

The motor 117 is associated with the sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In an example embodiment, the sensor 115 may be coupled to an analog-to-digital converter (not shown) that converts analog raw position data or velocity data to digital raw position or velocity data, respectively. In other example embodiments, the sensor 115 (e.g., digital position encoder) may provide a digital data output of raw position data or velocity data for the motor shaft 126 or rotor.

A first output (e.g., position data θ for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data SD for the motor 117) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., dc bus voltage and three phase current processing module). For example, the sensing circuit 124 is associated with the motor 117 for measuring three phase currents (e.g., current applied to the windings of the motor 117, back EMF (electromotive force) induced into the windings, or both).

Certain outputs of the primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 116 and position data θ from the sensor 115. The output of the phase converter 113 module (id, iq) is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide the speed data SD (e.g., motor shaft 126 speed in revolutions per minute), whereas the secondary processing module 116 may provide a measured (detected) level of the operating dc bus voltage Vdc of the motor 117 (e.g., on the dc bus of a vehicle). The dc voltage level on the dc bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the d-q axis current generation manager 109. The output of the calculation module 110 can adjust or impact the current commands iq_cmd and id_cmd generated by the d-q axis current generation manager 109 to compensate for fluctuation or variation in the dc bus voltage, among other things.

The rotor magnet temperature estimation module 104, the current shaping module 106, and the terminal voltage feedback module 108 are coupled to or are capable of communicating with the d-q axis current adjustment module 107. In turn, the d-q axis current adjustment module 107 may communicate with the d-q axis current generation manager or the summer 119.

The rotor magnet temperature estimation module 104 estimates or determines the temperature of the rotor permanent magnet or magnets. In an example embodiment, the rotor magnet temperature estimation module 104 may estimate the temperature of the rotor magnets from, one or more sensors located on the stator, in thermal communication with the stator, or secured to the housing of the motor 117.

In another example embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In an example embodiment, the system may operate in the following manner. The torque command generation module 105 receives an input control data message, such as a speed control data message, a voltage control data message, or a torque control data message, over a vehicle data bus 118. The torque command generation module 105 converts the received input control message into torque control command data T_cmd.

The d-q axis current generation manager 109 selects or determines the direct axis current command and the quadrature axis current command associated with respective torque control command data and respective detected motor shaft 126 speed data SD. For example, the d-q axis current generation manager 109 selects or determines the direct axis current command and the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data SD for the motor shaft 126, where the primary processing module 114 may convert raw position data provided by the sensor 115 into speed data SD.

The current adjustment module 107 (e.g., d-q axis current adjustment module) provides current adjustment data to adjust the direct axis current command id_cmd and the quadrature axis current command iq_cmd based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The terminal voltage feedback module 108 may further provide an additional feedback for adjustment to d-axis and q-axis current based on a terminal voltage threshold and estimates of the actual terminal voltages va, vb and vc provided by an estimation and threshold module 127, as will be described below. The estimation and threshold module 127 may further be coupled to outputs of the PWM generation module 112, which may provide the estimation and threshold module 127 with the inverter terminal voltages (va*, vb* and vc*). The estimation and threshold module 127 may estimate actual terminal voltages va, vb and vc of the inverter circuit 188 such that the inverter terminal voltages (va*, vb* and vc*) accurately resemble the actual output terminal voltages (va, vb and vc), as will be described further below. The estimation and threshold module 127 may further provide terminal voltage threshold, as will be described further below.

In an example embodiment, the motor 117 may include an interior permanent magnet (IPM) machine or a synchronous IPM machine (IPMSM).

The sensor 115 (e.g., shaft or rotor speed detector) may include one or more of the following: a direct current motor, an optical encoder, a magnetic field sensor (e.g., Hall Effect sensor), magneto-resistive sensor, and a resolver (e.g., a brushless resolver). In one configuration, the sensor 115 includes a position sensor, where raw position data and associated time data are processed to determine speed or velocity data for the motor shaft 126. In another configuration, the sensor 115 includes a speed sensor, or the combination of a speed sensor and an integrator to determine the position of the motor shaft.

In yet another configuration, the sensor 115 includes an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 includes an optical encoder with an optical source that transmits a signal toward a rotating object coupled to the motor shaft 126 and receives a reflected or diffracted signal at an optical detector, where the frequency of received signal pulses (e.g., square waves) may be proportional to a speed of the motor shaft 126. In an additional configuration, the sensor 115 includes a resolver with a first winding and a second winding, where the first winding is fed with an alternating current, where the voltage induced in the second winding varies with the frequency of rotation of the rotor.

Figure 2:
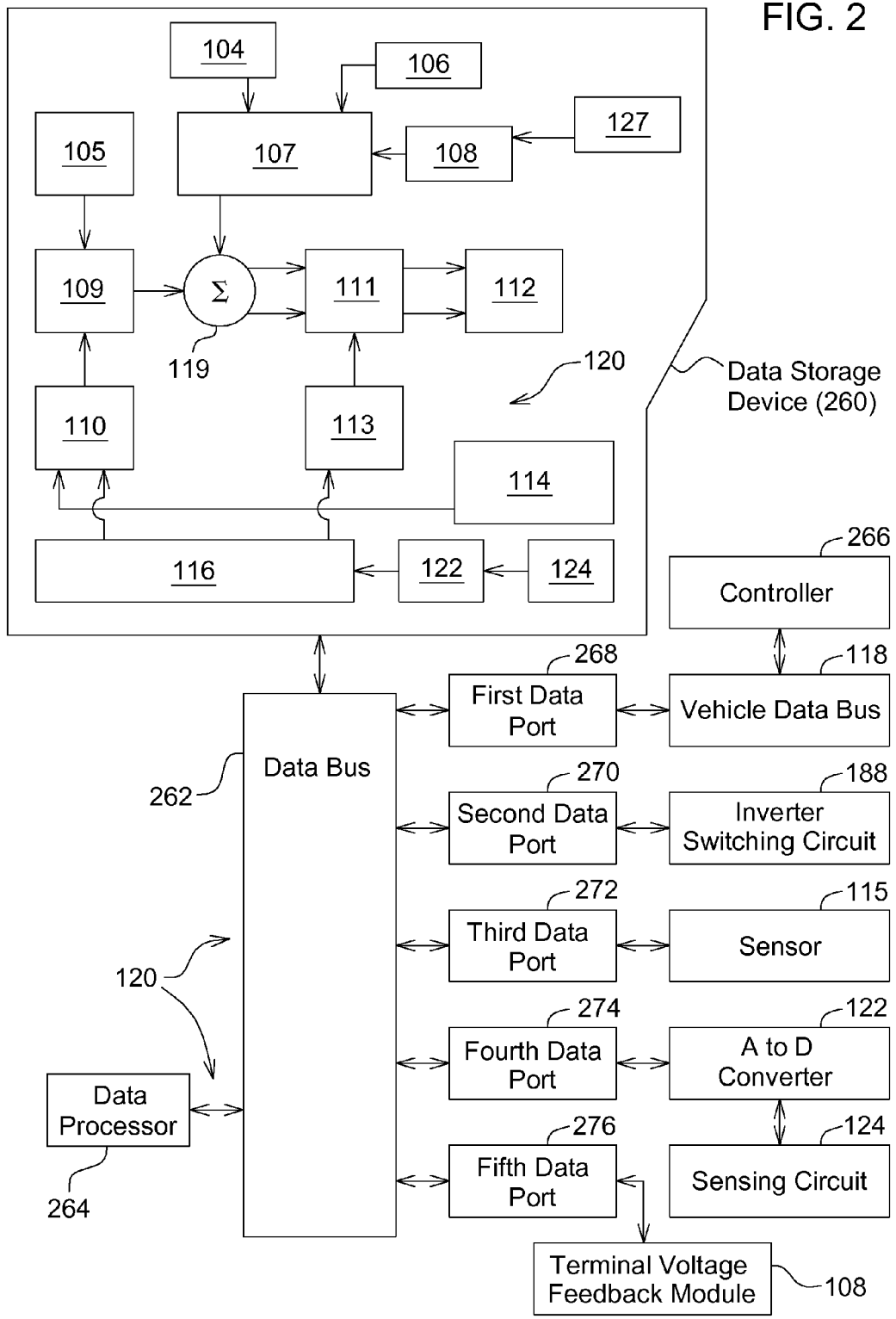

FIG. 2 is a block diagram of an electronic data processing system consistent with FIGS. 1A-B, according to an example embodiment. In FIG. 2, the electronic data processing system 120 includes an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272, a fourth data port 274 and a fifth data port 276, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, the controller 266, or other control devices.

In some example embodiments, the sensor 115 and the primary processing module 114 may be associated with or supported by a third data port 272 of the data processing system 120.

Referring back to FIGS. 1A-B and as described above, the PWM generation module 112 converts the direct axis voltage and quadrature axis voltage data from two phase data representations into three phase representations (e.g., three phase voltage representations, such as va*, vb* and vc*) for control of the motor 117, for example. va*, vb* and vc* may be referred to as inverter terminal voltages. Outputs of the PWM generation module 112 are coupled to an inverter circuit 188 coupled to the system processor 120.

Figure 3:
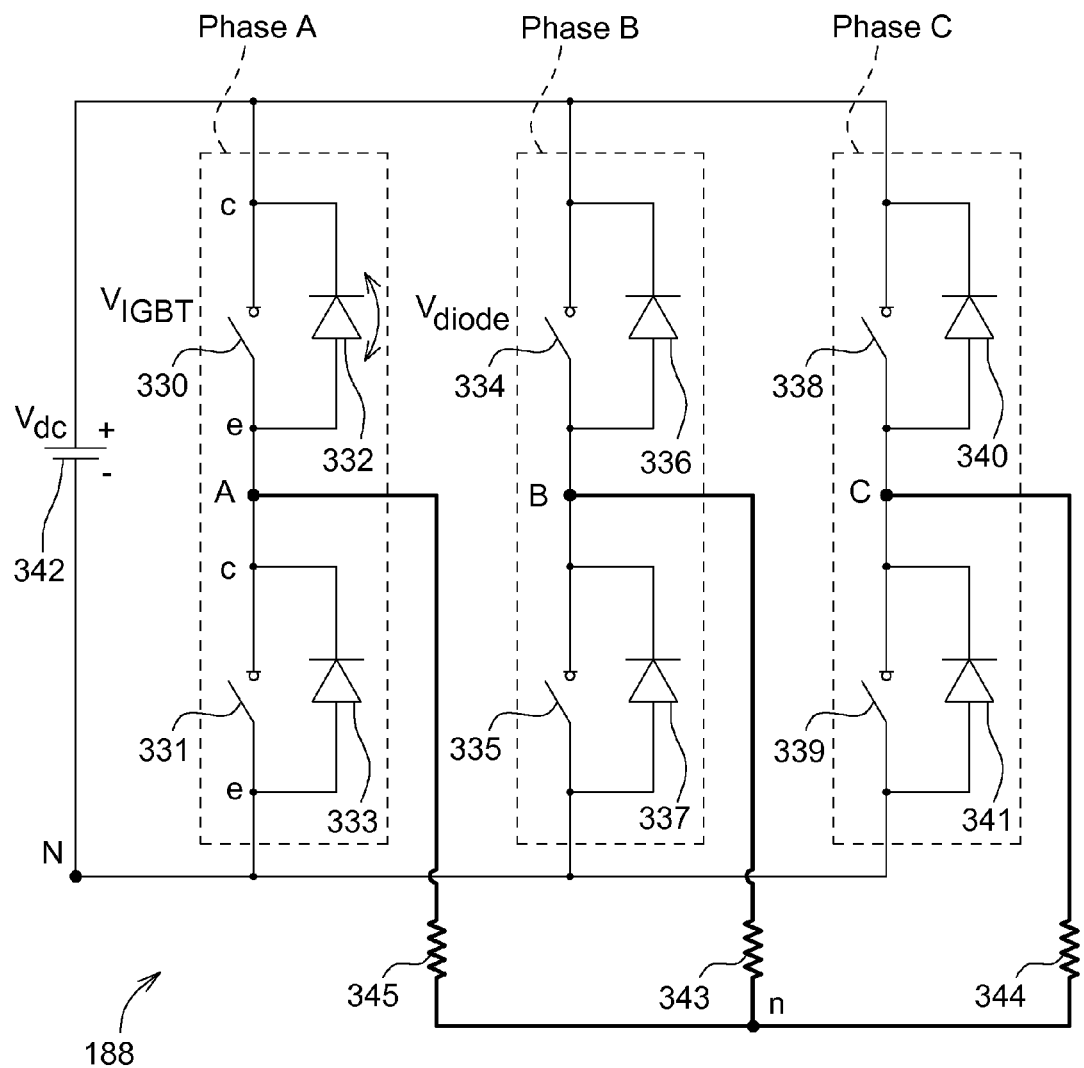

FIG. 3 illustrates an inverter circuit outputting control signals to an electrical motor, according to an example embodiment. The inverter circuit 188 includes electrical components including, but not limited to, switching semiconductors (330-331, 334-335 and 338-339), diodes (332-333, 336-337 and 340-341), motor phase impedance 343, a dc-bus voltage 342 to generate, modify and control pulse-width modulated signals or other alternating current signals (e.g., pulse, square wave, sinusoidal, or other waveforms) applied to the motor 117 of FIGS. 1A-B.

To prevent shoot through at the output of the inverter circuit 188, a dead time or blanking time is introduced in a PWM switching, which may cause mismatching between the d/q- axis voltage commands vd* and vq* (converted into three phase inverter terminal voltages va*, vb* and vc* via the pulse width modulation generation module 112) and the actual terminal voltages (e.g., va, vb and vc). During the dead time, neither the top switch nor the bottom switch of any given phase of the inverter circuit 188 conducts. In one example embodiment, switches 330, 334 and 338 constitute the top switches of one of the phases A, B and C, respectively, while switches 331, 335 and 339 constitute the bottom switches of one of the phases A, B and C, respectively.

During the dead time, the actual terminal voltages va, vb and vc are determined based on the direction of current flowing through one of the top or bottom diodes of one of the phases (e.g., diodes 332 or 333 corresponding to phase A). The dead time impact on the mismatching between the d/q-axis voltage commands vd* and vq* (converted into three phase inverter terminal voltages va*, vb* and vc* via the pulse width modulation generation module 112) and the actual terminal voltages va, vb and vc, may also depend on other factors including, but not limited to, the PWM switching frequency as the percentage ratio of a fixed dead time period of a PWM period varies as the PWM switching frequency changes, and motor operating mode. For example, when the IPM machine 117 is running in motoring mode, the actual inverter terminal voltage is less than the d/q-axis voltage commands, while when the motor is running in braking mode, the actual inverter terminal voltage is higher than the d/q-axis voltage commands. As a result, the d/q-axis commands may not be a good indicator of the actual terminal voltage indicator due to the described mismatching.

Voltage drops across switches and diodes of the inverter circuit 188 also contribute to the mismatching. For example, when one of the top or bottom switches of any given phase of the inverter circuit 188 conducts, there may be a voltage drop across a switch and/or a diode associated with one of the phases. For example, when the top switch 330 associated with phase A conducts, there may be a voltage drop across the switch 330 or the diode 332, which may be referred to as $V_{IGBT}$ of switch 330 or $V_{diode}$ of diode 332, respectively.

Therefore, accurately estimating the actual terminal voltages va, vb and vc enables the system to account for the mismatching between (va*, vb* and vc*) and (va, vb and vc) and accordingly adjusting the d/q-axis current command. The adjustment may in turn enable compensating for the extra high terminal voltage at the machine thus assuring motor control stability.

The estimation of the actual terminal voltages and adjustment of the d/q-axis current commands will be described below with reference to FIG. 3, as described above, as well as FIGS. 4-8.

Figure 4:
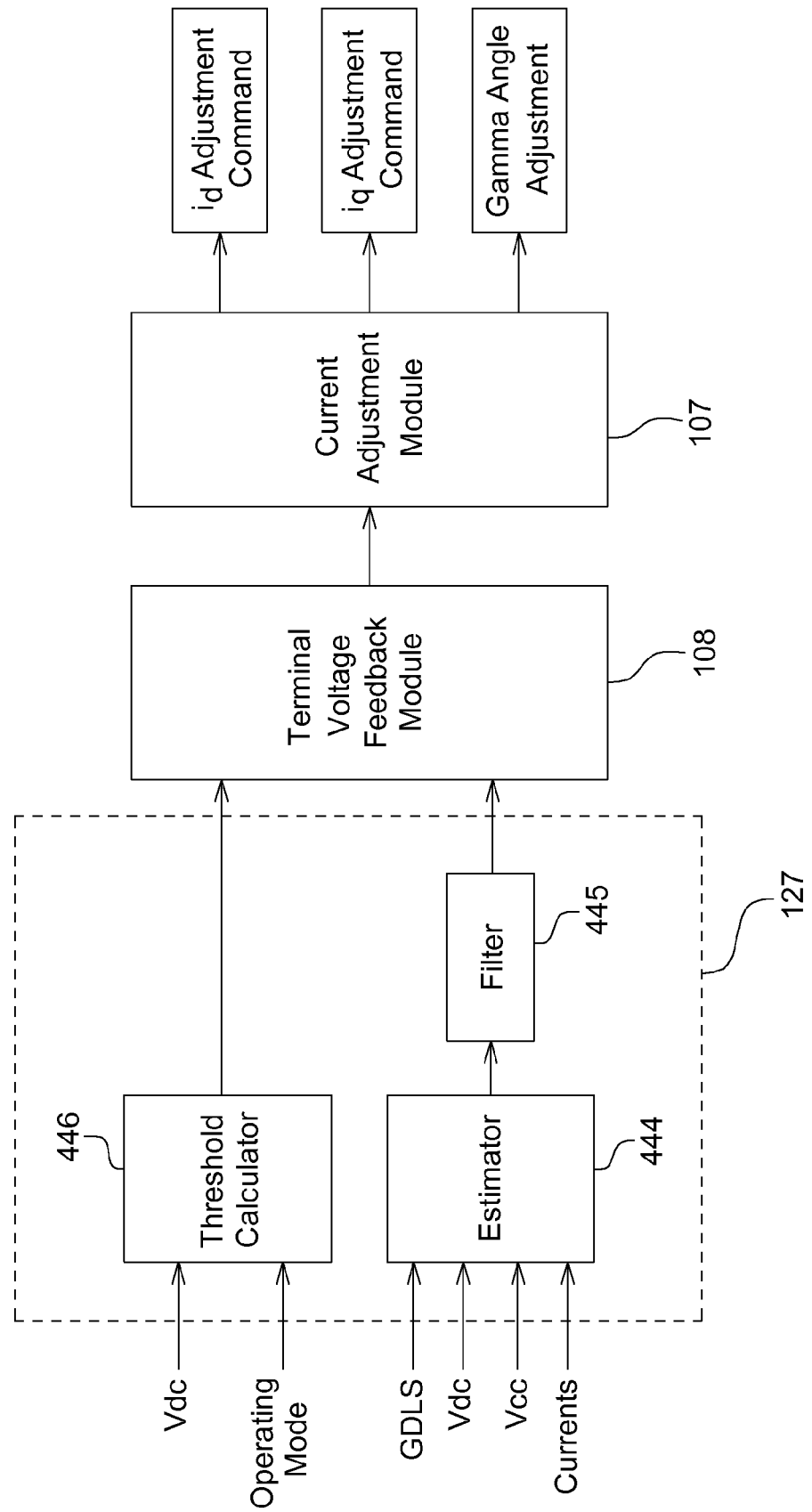

FIG. 4 illustrates particular modules, including an estimation and threshold module of the system shown in FIGS. 1A-B, according to an example embodiment. In particular, FIG. 4 illustrates the estimation and threshold module 127. The estimation and threshold module 127 may include an estimator 444 for estimating a three-phase line to negative rail averaging voltage ($V_{aN}$, $V_{bN}$ and $V_{cN}$), as will be described below. The estimation and threshold module 127 may further include a filter 445 for deriving an actual line-to-line voltage from the estimated line to negative rail voltage, as will be described below. The estimation and threshold module 127 may further include a threshold calculation module 446, which calculates a terminal voltage threshold, as will be described below. The terminal voltage threshold may then be used in determining a terminal voltage feedback, as will be described below. Furthermore, FIG. 4 illustrates the terminal voltage feedback module 108 shown in FIGS. 1A-B, which determines the terminal voltage feedback based on the terminal voltage threshold and the actual line-to-line voltage, as will be described below. FIG. 4 also illustrates the current adjustment module 107, shown in FIGS. 1A-B, which adjusts the d/q-axis current commands based on the terminal voltage feedback, as will be described below.

As discussed earlier, the modules depicted in FIG. 4 may be executed by the system processor 120, shown in FIGS. 1A-B, and implemented on a variety of hardware including, but not limited programmable logic devices such as FPGAs.

Figure 5:
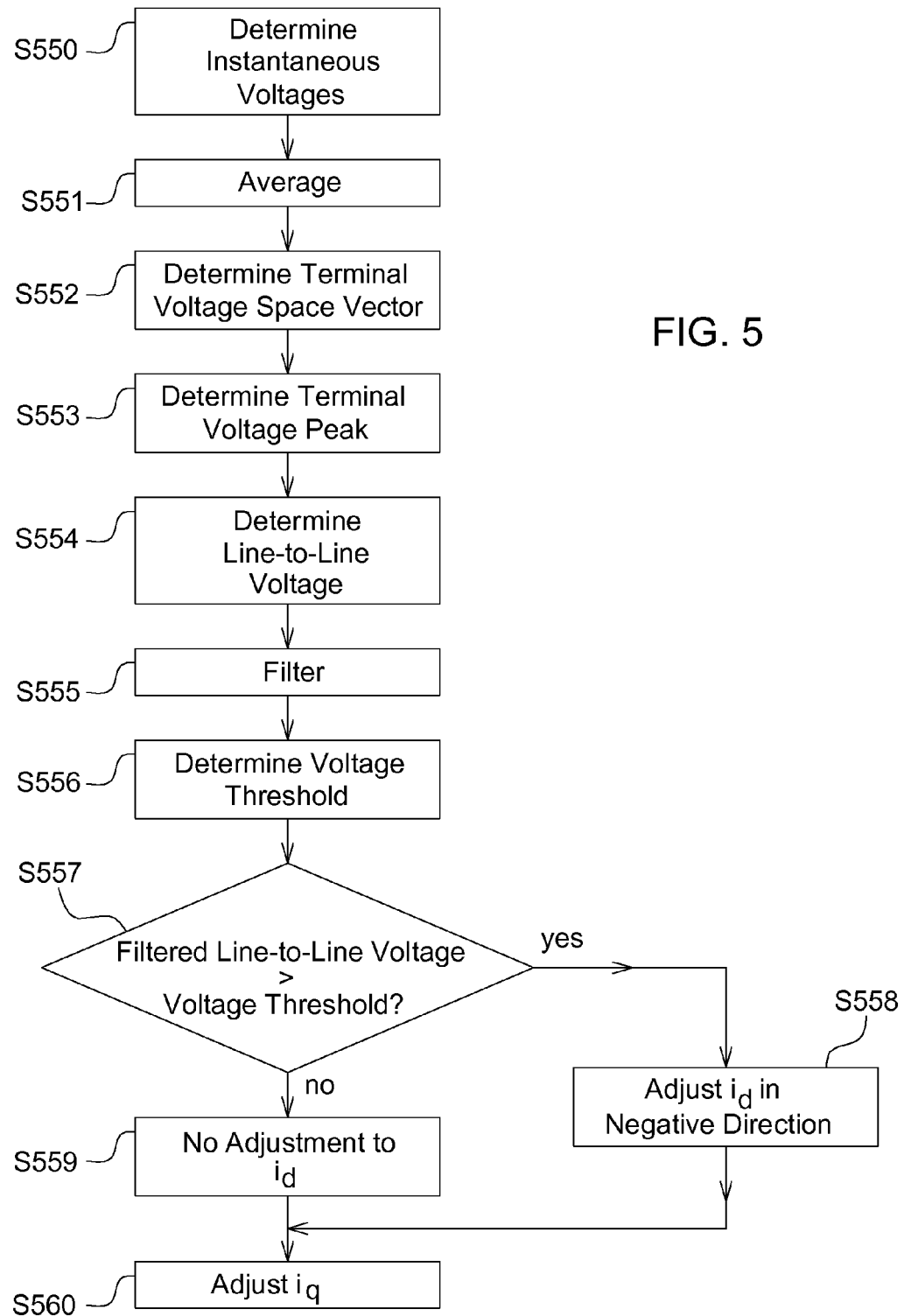
Figure 6:
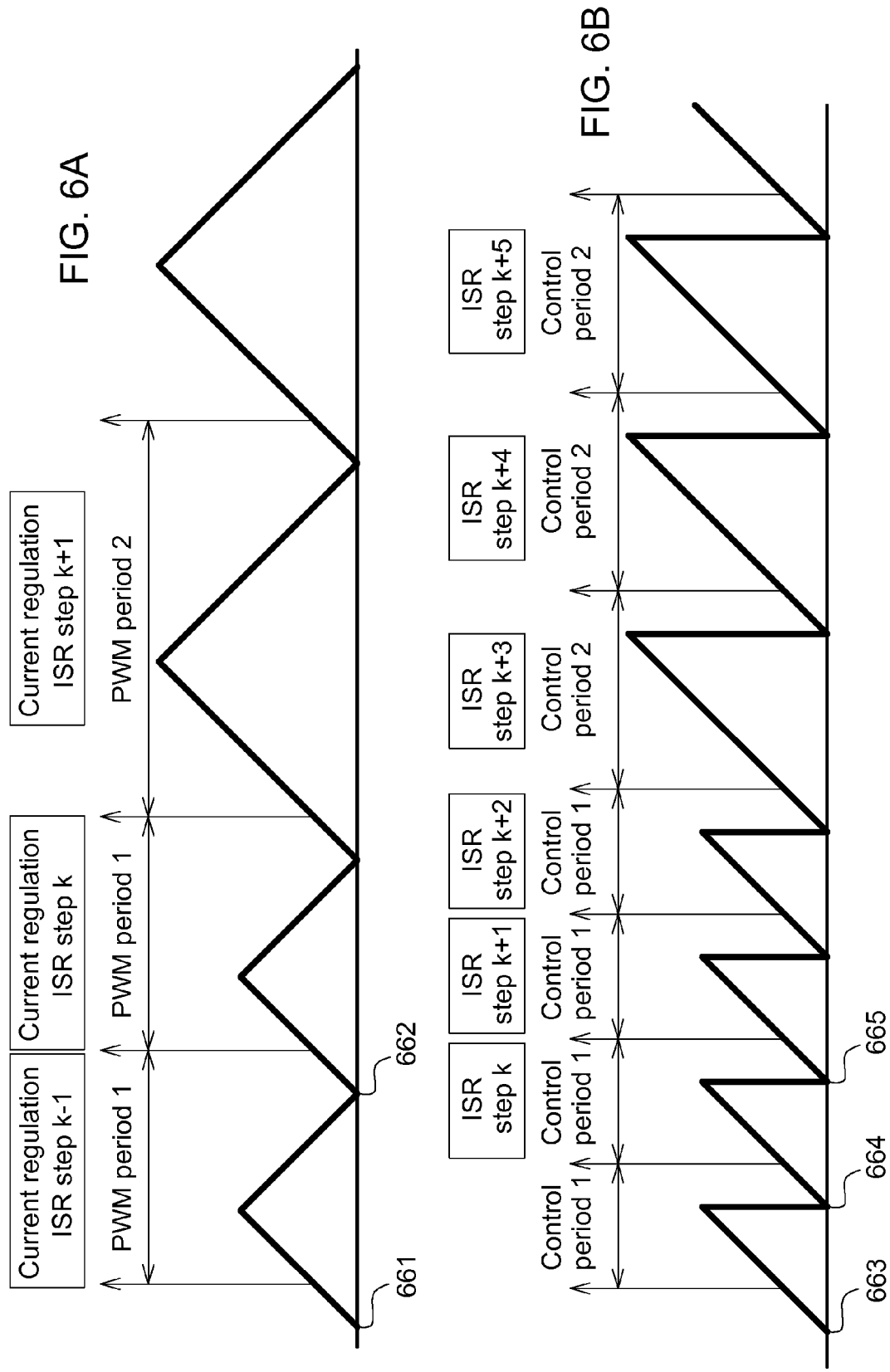

FIG. 5 illustrates a method carried out by the estimation and threshold module shown in FIG. 4, according to an example embodiment. At S550, the system processor 120, via estimator 444 shown in FIG. 4, determines a plurality of instantaneous voltages. The estimator 444 utilizes inputs such as the plurality of voltages using a plurality of data including, but not limited to, a dc-bus voltage, drive signals for driving each phase of the inverter circuit 188, the instantaneous current polarity, a voltage across at least one switch associated with the corresponding phase of the inverter circuit 188 (e.g., $V_{ce}$ across either the switch 330 or switch 331 associated with phase A, $V_{ce}$ across either the switch 334 or switch 335 associated with phase B, $V_{ce}$ across either the switch 338 or switch 339 associated with phase C, etc., as shown in FIG. 3 and described above). Hereinafter, a process for determining the plurality of instantaneous voltages will be described, with reference to FIGS. 6A-B and 7 as well.

FIGS. 6A-B illustrate a pulse width modulation (PWM) cycle of the pulse width modulation module of FIGS. 1A-B, for a single control mode and a double control mode, according to an example embodiment. $V_{xN}$ may be calculated over one PWM cycle or one control period. A single PWM cycle may be defined as the time from a rising edge on the signal to the next rising edge of the signal. For example, 661 to 662 defines one PWM cycle in FIG. 6A. Moreover, FIG. 6A illustrates a single control mode, in which case there is one control signal per PWM cycle. Therefore, in one example embodiment where the PWM switching frequency is 5 kHz and measurements are sampled at 25 MHz (e.g., 40 ns), then there will be 5000 counts (e.g. measurements) of $V_{xN}$ per each control period.

On the other hand, FIG. 6B depicts a double control mode, in which case there are two control signals per PWM cycle (e.g., 1 control signal per half of a single PWM cycle, where PWM cycle is defined from 663 to 665 (e.g., same as the PWM cycle in FIG. 6A), and half a cycle is defined as 663 to 664 and 664 to 665 as shown in FIG. 6B. Therefore, in the example embodiment where the PWM switching frequency is 5 kHz and measurements are sampled at 25 MHz (e.g., 40 ns), then for the case of double control mode, there will be half as many counts (e.g., measurements) of $V_{xN}$ (e.g. 2500) in each control period. As can be seen from FIGS. 6A-B PWM cycles may not be the same and may differ from one cycle to another due to, for example, varying PWM switching frequency.

Figure 7:
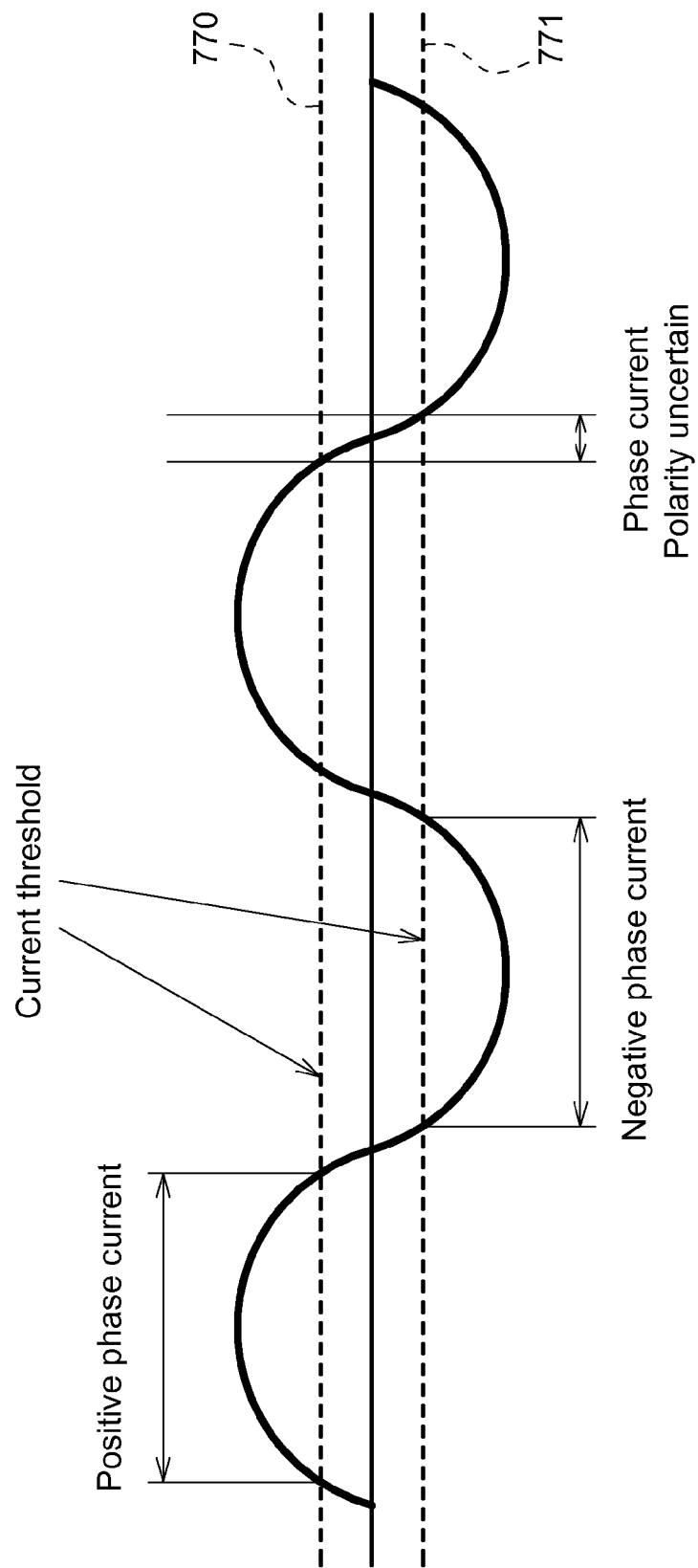

Let $V_{xN}$ denote an instantaneous voltage associated with each phase of the inverter circuit 188, where X may be any one of A, B or C, shown in FIG. 3 (e.g., $V_{AN}$, $V_{BN}$ and $V_{CN}$). Then for every count, the system processor 120, in one example embodiment, determines a $V_{xN}$ for each phase, based on a current polarity in the inverter circuit 188. FIG. 7 illustrates an instantaneous current polarity in an inverter circuit of the system, according to an example embodiment. The system processor 120 determines the $V_{xN}$ as follows:

$I_{xN}$ is positive and top switch gate drive signal is On, then
$$V_{xN}=V_{dc}-V_{IGBT}$$

$I_{xN}$ is positive and top switch gate drive signal is Off, then
$V_{xN} = -V_{diode}$ $I_{xN}$ is negative and bottom switch gate drive signal is On, then
$V_{xN} = V_{IGBT}$ $I_{xN}$ is negative and bottom switch gate drive signal is Off, then
$V_{xN} = V_{dc} + V_{diode}$ At any given one time for a given phase of the inverter circuit 188, either the top or bottom switch is turned on or they may both be off (e.g., dead time or blanking time as described above). For example, the length of time, during each PWM cycle, where the top or bottom switches are turned on may depend on a duty cycle associated with each switch of each phase in a given PWM cycle. For example, the duty cycle of switch 550 associated with phase A may be % 40 percent, which means that in any given PWM cycle, switch 330 is on for % 40 percent of the time while switch 331 is on for 60% of the time in an ideal case without deadtime inserted. However, as discussed above, in any given PWM cycle, a very small amount of dead time is introduced during which neither the top or bottom switch is turned on (e.g., 3 micro seconds), in order to prevent shoot through.

Furthermore, the switches may be turned on or off via the gate drive signals/voltages, which may constitute relatively small amount of voltage needed to turn on/off a given transistor (e.g., the IGBT transistor operating as switch 330).

Referring back to determining the plurality of instantaneous voltages at S550, the system processor 120 may perform the following. For example, when $I_{xN}$ is larger than the positive current threshold 770, then phase X current polarity is positive which means either the top switch of phase X or the bottom diode of phase X conducts. On the other hand, when $I_{XN}$ is smaller than the negative current threshold 771, then phase X current polarity is negative which means either the bottom switch of phase X or the top diode of phase X conducts. The positive and negative current thresholds 770 and 771 are design parameters, which may be determined based on empirical studies (e.g., ±5 A, ±10 A, ±20 A, etc.).

Therefore, as an example, when $I_{AN}$ is positive, either switch 330 or diode 333 of FIG. 3 conducts. The determination of whether switch 330 or diode 333 conducts may depend on the switch gate drive signal for phase A. Accordingly, if the top switch gate drive signal is On, then switch 330 conducts, which means that $V_{AN} = V_{dc} - V_{IGBT}$. However, if the top switch drive signal is Off, then diode 333 conducts, which means that $V_{AN} = -V_{diode}$.

In yet another example embodiment, when $I_{AN}$ is negative, either switch 331 or diode 332 of FIG. 3 conducts. The determination of whether switch 331 or diode 332 conducts may depend on the switch gate drive signal for phase A. Accordingly, if the bottom switch gate drive signal is On, then switch 331 conducts, which means that $V_{AN} = V_{IGBT}$. However, if the bottom switch drive signal is Off, then diode 332 conducts, which means that $V_{AN} = V_{dc} + V_{diode}$. $V_{BN}$s and $V_{CN}$s may be determined in a similar manner.

In yet another example embodiment, the system processor 120 determines the instantaneous voltages $V_{xN}$ based on the voltage $V_{ce}$ across any of the switches 330, 331, 334, 335, Yes 338 or 339 shown in FIG. 3. The voltage $V_{ce}$ for the top switch of each phase of the inverter circuit 188 (e.g., switches 330, 334 and 338) may be referred to as $V_{ce\_top}$, while the voltage $V_{ce}$ for the bottom switch of each phase of the inverter circuit 188 (e.g., switches 331, 335 and 339) may be referred to as $V_{ce\_bottom}$. Then, $V_{ce\_top}$ is low and top switch gate drive signal is On, then
$V_{xN} = V_{dc} - V_{IGBT}$ $V_{ce\_top}$ is low and top switch gate drive signal is Off, then
$V_{xN} = V_{dc} + V_{diode}$ $V_{ce\_bottom}$ is low and bottom switch gate drive signal is On, then $V_{xN} = V_{IGBT}$ $V_{ce\_bottom}$ is low and bottom switch gate drive signal is Off, then $V_{xN} = -V_{diode}$ whether $V_{ce\_top}$ or $V_{ce\_bottom}$ is low or not may refer to whether $V_{ce\_top}$ or $V_{ce\_bottom}$ are low enough such that the corresponding switch is in a conducting state. For example, each one of $V_{ce\_top}$ and $V_{ce\_bottom}$ of a given phase may be compared to a voltage threshold (e.g., 5V) to determine whether $V_{ce\_top}$ or $V_{ce\_bottom}$ is high or low. The voltage threshold may be a design parameter determined based on empirical studies.

Therefore, as an example, when the top switch (e.g., switch 330) is closed and conducting for phase A of the inverter circuit 188 (e.g., $V_{ce\_top}$ is low) and the top switch gate drive signal is On, then $V_{AN} = V_{dc} - V_{IGBT}$. However, if the top switch drive signal is Off, then switch 330 is off, while $V_{ce\_top}$ is still low, which means that the current flows through the diode 332 and therefore $V_{AN} = V_{dc} + V_{diode}$.

In yet another example embodiment, when the bottom switch (e.g., switch 331) is closed and conducting for phase A of the inverter circuit 188 (e.g., $V_{ce\_bottom}$ is low) and the bottom switch gate drive signal is On, then $V_{AN} = V_{IGBT}$. However, if the bottom switch drive signal is Off, then switch 331 is off, while $V_{ce\_bottom}$ is still low, which means that the current flows through the diode 333 and therefore $V_{AN} = -V_{diode}$. $V_{BN}$s and $V_{CN}$s may be determined in a similar manner.

Referring back to the calculation of the instantaneous voltages $V_{xN}$ based on the instantaneous current polarity, there may be a, scenario, as shown in FIG. 7, where the polarity of the instantaneous current for a given phase of the inverter circuit 188 may be in between the positive current threshold 770 and the negative current threshold 771 due to, for example, a drifting CT offset. A current polarity in between thresholds 770 and 771 may be indicative of an uncertain phase current polarity. As a result, the instantaneous current polarity may not be suitable for determining the instantaneous voltages. Therefore, in one example embodiment, when the instantaneous current polarity is uncertain (e.g., in between thresholds 770 and 771), the system processor 120 calculates the instantaneous voltages based on $V_{ce}$ as described above.

In yet another example embodiment, the system processor 120 may use any of the two described methods for determining the plurality of instantaneous voltages (e.g. based on instantaneous current polarity and $V_{ce}$), interchangeably and or simultaneously. The system processor 120 may augment the data obtained using the instantaneous current polarity with the data obtain based on $V_{ce}$, in order to obtain a better estimate of the actual output terminal voltages.

Once the processor 120 determines the plurality of instantaneous voltages (e.g., 5000 measurement for $V_{AN}$, $V_{BN}$ and $V_{CN}$ in a single control mode shown in FIG. 6A or 2500 measurement for $V_{AN}$, $V_{BN}$ and $V_{CN}$ in a double control mode shown in FIG. 6B), the processor 120, at step S551, averages the instantaneous voltages over one active current regulation interval. One active current regulation interval may be a single PWM cycle (in a single control mode) or half a PWM cycle (in a double control mode).

The processor 120 may average the instantaneous voltages (also referred to as line-to-negative rail averaging voltage), $V_{XN}$, based on:

$$V_{XN} = \frac{1}{T} \cdot \sum_{k=1}^{T} V_{XN}(k)$$

where T is the total number of counts/measurement samples per PWM cycle or per control interval (e.g., 5000 counts per PWM cycle and per control interval in a single control mode or 2500 counts per control mode in a double control mode (assuming a frequency of 5 kHz and a sampling rate of 25 mHz (e.g., 40 ns)).

At S552, the system processor 120 determines a terminal voltage vector space using the averaged instantaneous voltages $V_{XN}$. The processor 120 determines the terminal voltage vector space based on:

$$\vec{V}_s = \frac{2}{3} \cdot \left( V_{AN} + V_{BN} \cdot e^{j\frac{2\pi}{3}} + V_{CN} \cdot e^{j\frac{4\pi}{3}} \right)$$

The processor 120 splits the real and imaginary parts of the space vector $V_s$, in order to calculate the magnitude of the space vector $V_s$, based on:

$$V_{s\_real} = \frac{2}{3} \cdot \left( V_{AN} + V_{BN} \cdot \cos\left(\frac{2\pi}{3}\right) + V_{CN} \cdot \cos\left(\frac{4\pi}{3}\right) \right)$$

$$V_{s\_imag} = \frac{2}{3} \cdot \left( V_{BN} \cdot \sin\left(\frac{2\pi}{3}\right) + V_{CN} \cdot \sin\left(\frac{4\pi}{3}\right) \right)$$

By calculating the magnitude of the space vector $V_s$, the processor 120 determines the line-to-neutral terminal voltage peak (S553) based on:

$$V_{time\_neutral\_peak} = V_s = \sqrt{V_{s\_real}^2 + V_{s\_imag}^2}$$

The line-to-neutral terminal voltage peak may be designated as $v_{an}$, $vb_{bn}$ and $v_{cn}$. Thereafter, the processor 120 may determine the actual line-to-line fundamental root mean square (rms) voltage (e.g., actual terminal voltage) (S554) based on:

$$V_{line\_line\_rms} = \frac{\sqrt{3}}{\sqrt{2}} \cdot V_s$$

At S555, the system processor 120 may filter the determined actual terminal voltage ($V_{line-line-rms}$). The system processor 120 may filter the determined actual terminal voltage because the determined actual terminal voltage may include undesired oscillations. Therefore, in order to provide a smoother control feedback signal, a filtering may be performed to eliminate the undesired oscillations. In one example embodiment, the filtering may be based on low-pass filtering of the determined actual line-to-line voltage, where low-pass filtering may constitute calculating a moving average of the determined actual line-to-line fundamental rms voltage (e.g., actual terminal voltage).

At S556, the system processor 120, via the threshold calculation module S332, may determine a terminal voltage threshold such as the threshold calculator 446 of FIG. 4. The threshold calculator utilizes inputs including, but not limited to, an operating mode of the AC machine (e.g., the IPM machine) and a dc bus voltage of the AC machine, as shown in FIG. 4. For example, a flexibility factor η, may be utilized such that the system processor 120 determines the terminal voltage threshold by multiplying the flexibility factor η with a theoretical maximum line-to-line terminal voltage (e.g. $V_{dc}$/sqrt(2)), where sqrt(2) refers to the mathematical operation for determining a square root of 2. The flexibility factor η may be set differently in the motoring mode as compared to the breaking mode. For example, η may be set to 0.91 in the motoring mode and 0.92 in the breaking mode. The choice of η for each operating mode may be a design parameter determined based on empirical studies.

At S557, the system processor 120, via the terminal voltage feedback module 108, shown in FIGS. 1A-B and 4, determines a terminal voltage feedback. The system processor 120 may determine the terminal voltage feedback by determining an error based on the filtered actual line-to-line voltage and the terminal voltage threshold. The system processor 120 may determine the error by comparing the filtered actual line-to-line voltage with the determined terminal voltage threshold and accordingly determining the difference between the filtered actual line-to-line voltage and the determined terminal voltage threshold.

If the filtered actual line-to-line voltage exceeds the terminal voltage threshold, the processor 120, via the current adjustment module 107 and using the error as a feedback parameter, may adjust the d-axis current command by decreasing the d-axis current command (S558).

However, if the actual line-to-line voltage is lower than the terminal voltage threshold, the processor 120 makes no adjustment in the d-axis current command (S559). At S560, the processor 120 adjusts the q-axis current command based on the adjustment of the d-axis current command so as to keep the total current magnitude constant. Therefore, if no adjustment is made to the d-axis current command at S559, then no subsequent adjustment to q-axis current command is made at S560, either.

Figure 8:
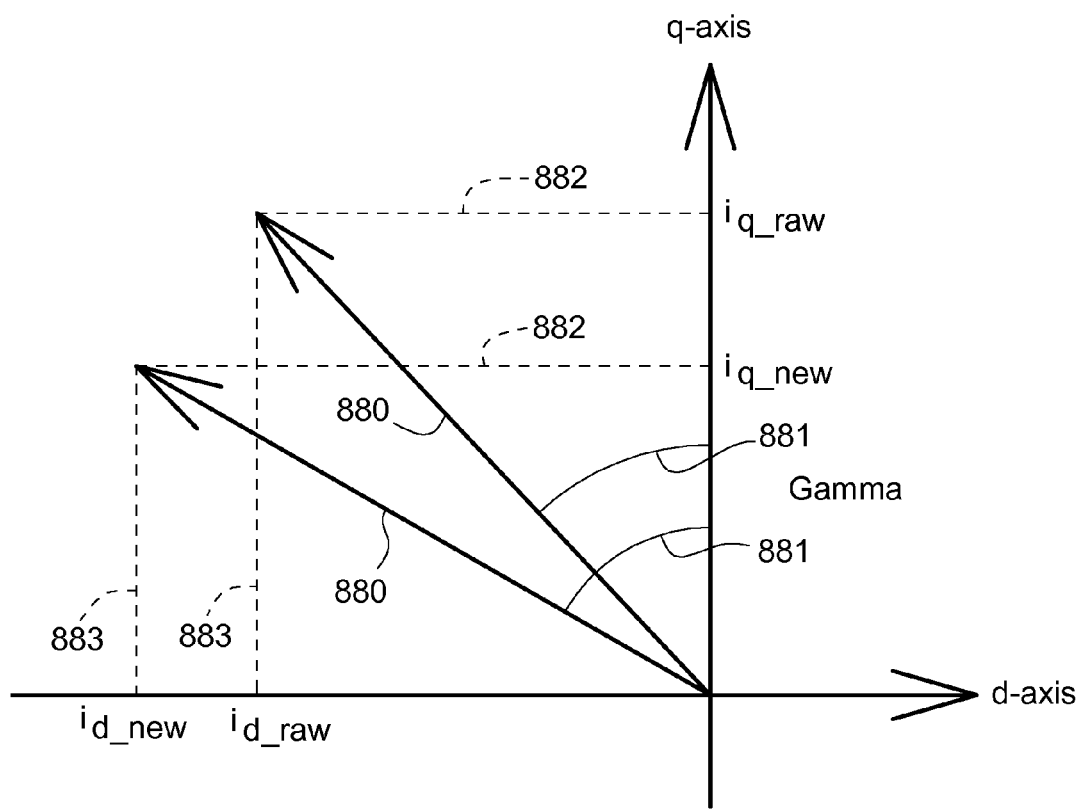

FIG. 8 illustrates adjustments to the d/q-axis current magnitudes and the corresponding angle such that the total current magnitude is kept constant, according to an example embodiment. Keeping the total current magnitude 880 the same (by adjusting the d-axis current command 882 and q-axis current command 883) while changing the gamma angle 881 may enable a better control of the machine terminal voltage and avoiding excessive heating in motor windings on the inverter circuit 188.

Referring to FIGS. 1A-B and 3, in one example embodiment, the current adjustment module 107 may be executed by the system processor 210 in order to determine the d/q-axis current adjustment command and the gamma angle (designated as id adjustment command, iq adjustment command and Gamma angle adjustment in FIG. 3).

The adjustments to the d/q-axis current commands such that the total current magnitude is kept constant may be based on the following calculations:

$$I_{s\_cmd} = \sqrt{I_{d\_cmd\_raw}^2 + I_{q\_cmd\_raw}^2} \quad (1)$$

where $I_s$ 880 of FIG. 8 is the total current magnitude. The adjustment to the d-axis current command 882 may be determined based on:

$$I_{d\_cmd\_new} = I_{d\_cmd\_raw} - I_{d\_cmd\_adjusted} \quad (2)$$

Therefore, given (1) and (2), the adjustment to the q-axis current command 883 may be determined based on:

$$I_{q\_cmd\_new} = \sqrt{I_{s\_cmd}^2 - I_{d\_cmd\_new}^2}$$

Further details regarding how the processor 120 may determine the error as well as the adjustments to the d/q-axis current command are described in another patent application by the inventors (U.S. Pub. 2012/0217923), incorporated herein by reference, in its entirety.

As described above, the inventors have discovered that estimating the actual line-to-line voltage (e.g., actual terminal voltage) at the output of the inverter circuit 188 and accordingly adjusting the d/q-axis current command serve as a better output torque estimator and thus may close the torque control loop for controlling the underlying AC machine.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A control device for controlling an alternating current (AC) machine, comprising:
    a processor configured to,
        determine a plurality of instantaneous voltages corresponding to a plurality of phase voltages of an inverter, the inverter driving the AC machine,
        determine an actual line-to-line voltage of the inverter based on the plurality of instantaneous voltages, and
        determine a terminal voltage feedback for controlling the AC machine based on the determined actual line-to-line voltage and a terminal voltage threshold.

2. The control device of claim 1, wherein the processor is configured to determine the plurality of instantaneous voltages by,
    determining an instantaneous current polarity associated with a corresponding phase of the inverter based on at least one a positive current threshold and a negative current threshold,
    determining the plurality of instantaneous voltages based on a voltage across at least one switch associated with the corresponding phase of the inverter upon the instantaneous current polarity being less than the positive current threshold and greater than the negative current threshold, and
    determining the plurality of instantaneous voltages based on the instantaneous current polarity associated with the corresponding phase of the inverter upon at least one of the instantaneous current polarity being greater than the positive current threshold and the instantaneous current polarity being less than the negative current threshold.

3. The control device of claim 1, wherein the processor is configured to determine the actual line-to-line voltage by,
    averaging the determined instantaneous voltages for each one of the plurality of phase voltages of the inverter over at least one of a single pulse width modulation (PWM) cycle of a PWM module and half of the single PWM cycle of the PWM module, the PWM module converting a two-phase representation of an inverter terminal voltage for driving the inverter to a three-phase representation of the inverter terminal voltage.

4. The control device of claim 3, wherein the processor is further configured to determine the actual line-to-line voltage by determining a terminal voltage space vector representation of the averaged instantaneous voltages.

5. The control device of claim 4, wherein the processor is further configured to determine the actual line-to-line voltage by determining a terminal voltage peak of the terminal voltage space vector representation of the averaged instantaneous voltages.

6. The control device of claim 1, wherein the processor is configured to determine the terminal voltage feedback by,
    filtering the determined actual line-to-line voltage.

7. The control device of claim 6, wherein the processor is further configured to determine the terminal voltage feedback by,
    determining an error based on the filtered actual line-to-line voltage and the terminal voltage threshold, and
    adjusting d/q-axis current commands based on the determined error such that the terminal voltage feedback is below the terminal voltage threshold and the total current magnitude is constant.

8. The control device of claim 1, wherein the processor is further configured to,
    determine the terminal voltage threshold based on an operating mode of the AC machine and a dc bus voltage of the AC machine.

9. The control device of claim 8, wherein the operating mode of the AC machine is at least one of a motoring mode and a braking mode of the AC machine.

10. The control device of claim 1, wherein the control device is a field programmable gate array (FPGA).

11. The control device of claim 1, wherein the AC machine is at least one of an Interior Permanent Magnet (IPM) machine, an induction machine and a surface mounted permanent magnet machine.

12. A method for controlling an alternating current (AC) machine, comprising:
    determining, by a processor, a plurality of instantaneous voltages corresponding to a plurality of phase voltages of the inverter, the inverter driving the AC machine;
    determining, by the processor, an actual line-to-line voltage of the inverter based on the plurality of instantaneous voltages; and
    determining, by the processor, a terminal voltage feedback for controlling the AC machine, based on the determined actual line-to-line voltage and a terminal voltage threshold.

13. The method of claim 12, wherein the determining the plurality of instantaneous voltages comprises:
    determining an instantaneous current polarity associated with a corresponding phase of the inverter based on at least one a positive current threshold and a negative current threshold,
    determining the plurality of instantaneous voltages based on a voltage across at least one switch associated with the corresponding phase of the inverter upon the instantaneous current polarity being less than the positive current threshold and greater than the negative current threshold, and
    determining the plurality of instantaneous voltages based on the instantaneous current polarity associated with the corresponding phase of the inverter upon at least one of the instantaneous current polarity being greater than the positive current threshold and the instantaneous current polarity being less than the negative current threshold.

14. The method of claim 12, wherein the determining the actual line-to-line voltage comprises:
    averaging the determined instantaneous voltages for each one of the plurality of phase voltages of the inverter over at least one of a single pulse width modulation (PWM) cycle of a PWM module and half of the single PWM cycle of the PWM module, the PWM module converting a two-phase representation of an inverter terminal voltage for driving the inverter to a three-phase representation of the inverter terminal voltage.

15. The method of claim 14, wherein the determining the actual line-to-line voltage further comprises:
    determining a terminal voltage space vector representation of the averaged instantaneous voltages.

16. The method of claim 15, wherein the determining the actual line-to-line voltage further comprises:
   determining a terminal voltage peak of the terminal voltage space vector representation of the averaged instantaneous voltages.

17. The method of claim 12, wherein the determining the terminal voltage feedback comprises:
   filtering the determined actual line-to-line voltage.

18. The method of claim 17, wherein the determining the terminal voltage feedback further comprises:
   determining an error based on the filtered actual line-to-line voltage and the terminal voltage threshold, and
   adjusting d/q-axis current commands based on the determined error such that the terminal voltage feedback is below the terminal voltage threshold and a total current magnitude is constant.

19. The method of claim 12, further comprising:
   determining the terminal voltage threshold based on an operating mode of the AC machine and a dc bus voltage of the AC machine.

20. The method of claim 19, wherein the operating mode of the AC machine is at least one of a motoring mode and a braking mode of the AC machine.

21. The method of claim 12, wherein the AC machine is at least one of an Interior Permanent Magnet (IPM) machine, an induction machine and a surface mounted permanent magnet machine.

\* \* \* \* \*